March 13, 1951

C. S. ASH 2,545,130

VEHICLE WHEEL

Filed April 14, 1947

INVENTOR.
Charles S. Ash
BY
Morgan, Finnegan & Durham
ATTORNEYS

March 13, 1951 C. S. ASH 2,545,130
VEHICLE WHEEL
Filed April 14, 1947 3 Sheets-Sheet 3

INVENTOR.
Charles S. Ash
BY
Morgan, Finnegan + Durham
ATTORNEYS

Patented Mar. 13, 1951

2,545,130

UNITED STATES PATENT OFFICE 2,545,130

VEHICLE WHEEL

Charles S. Ash, Milford, Mich.

Application April 14, 1947, Serial No. 741,265

2 Claims. (Cl. 301—63)

The present invention relates to vehicle wheels of the web or disc type which are stronger and more economically fabricated than conventional wheels of the type.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for an object the provision of an improved vehicle wheel of the disc or web type which is strong and economical to manufacture. The invention provides a wheel of the type mentioned which may be made of uniform thickness in the finished wheel and still attain the strength required, thus providing a wheel of considerably simpler and more economical fabrication than conventional wheels of the type. Another object is the provision of a wheel having a more strongly formed web or disc, stronger and safer mounting means, and a wheel particularly adapted to dual mounting.

Figure 3:
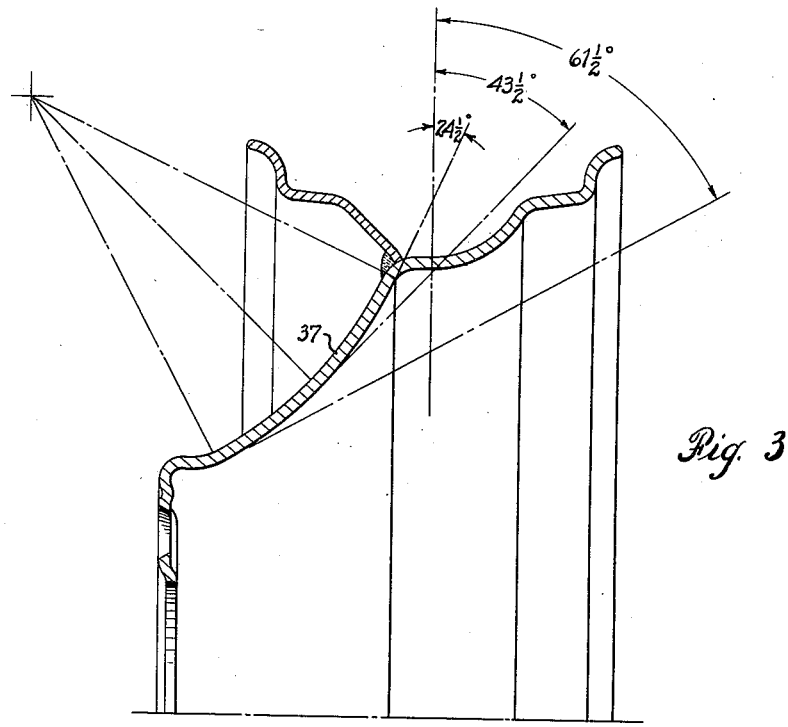
Fig. 3 is a cross-sectional view of one of the wheels such as shown in Fig. 1 illustrating certain principles of the invention.
Figure 4:
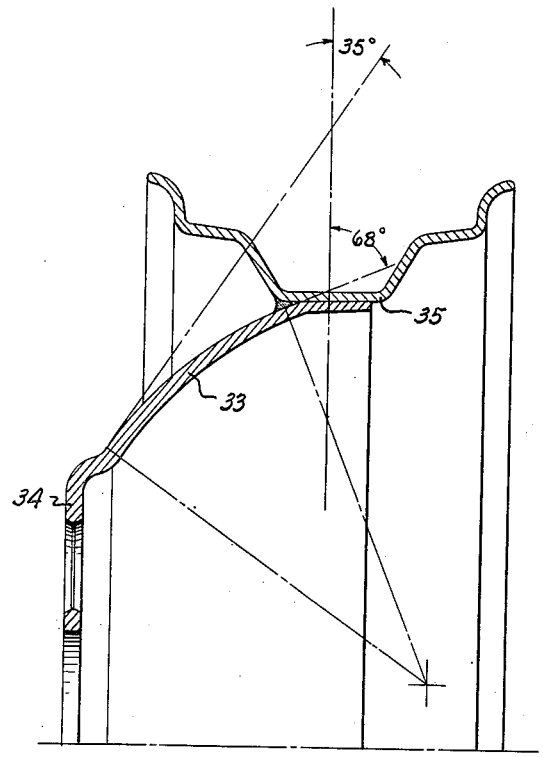
Fig. 4 is a cross-sectional view of a conventional wheel whereby the principles of the invention are illustrated.

The principles of the formation of web portion 62 of the wheel of the invention will best be understood by reference to Figs. 3 and 4 of the drawings. Fig. 4 shows a conventional demountable at the hub type of disc wheel having a web portion 33 conventionally curved in a concave fashion from the mounting portion 34 to the rim 35. It will be noted that the angle of tangents of the web formed with a line normal to the axis of the wheel increases as such tangents are taken from the central portion of the web radially outwardly, and that the strength of the web formation thus increases in the same direction. However, the greater strength in a wheel is required at the hub and progressively less strength is required radially outwardly, so that such wheels are customarily formed with webs of tapered or decreasing thickness of metal, as shown in Fig. 4. The fabrication of such a wheel is expensive and also frequently results in weakness in the web due to the strains imposed in drawing to the desired form.

Figure 1:
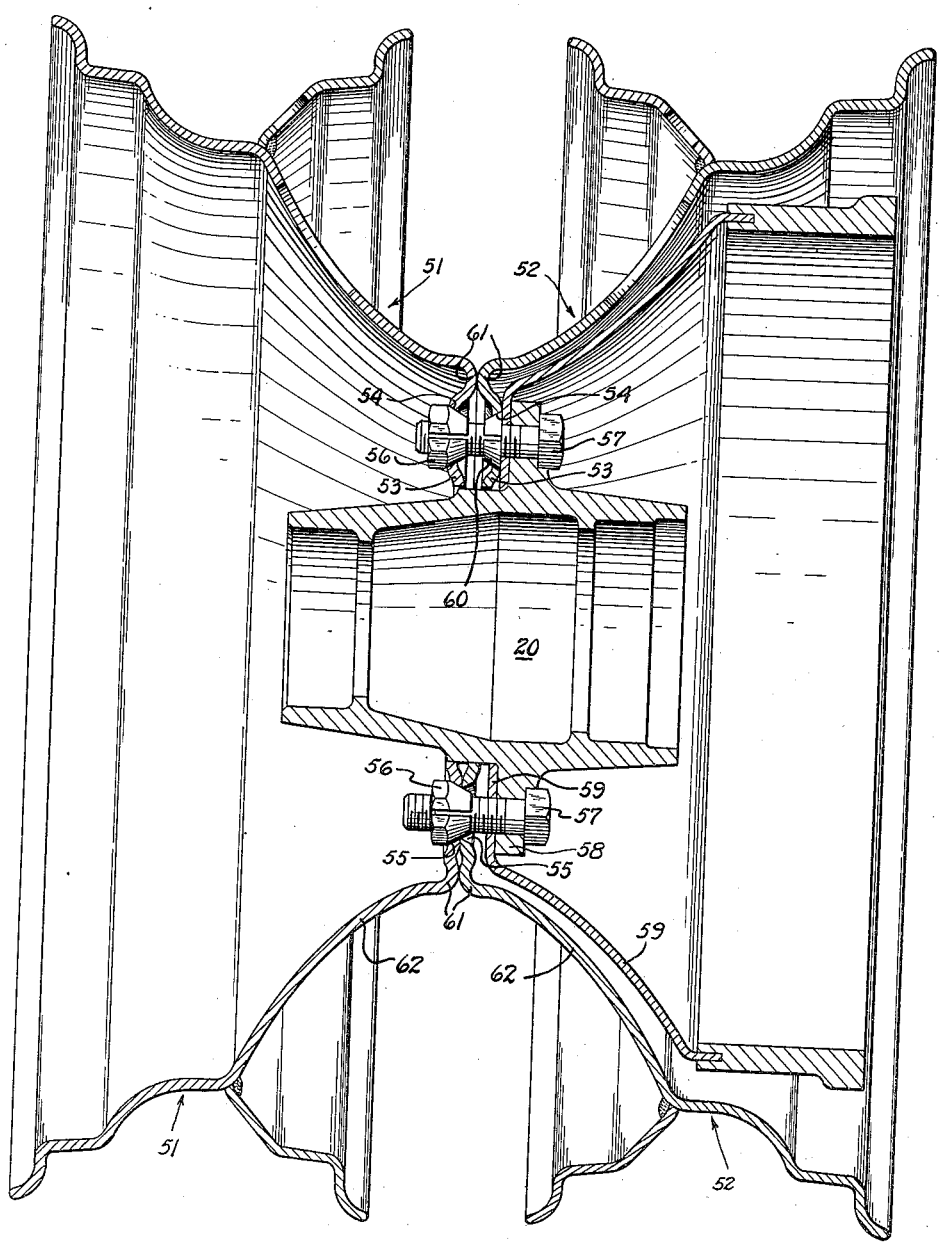
Fig. 1 is a cross-sectional view of a dual disc wheel assembly embodying the present invention.

The wheel web 37 shown in Fig. 3 of the drawings is formed with a convex configuration in accordance with the present invention, and the particular wheel shown is one adapted for dual mounting as shown in Fig. 1. It will be noted that in this wheel the angle of the tangents of the web to a line normal to the axis of the wheel decreases as such tangents are taken from adjacent the hub portion radially outwardly to the rim. The center, or centers, of curvature of the web is on the side of the web more remote from the axis of the wheel, while in the conventional wheel shown in Fig. 4 such center, or centers, is on the side of the web near the axis of the wheel. It is, therefore, clear that in applicant's wheel the web is stronger adjacent the hub and decreases in strength radially outwardly toward the rim, the strength being thus allocated where wheel functions require it. Applicant's web is, therefore, formed of uniform thickness of metal throughout, with a resulting saving in fabricating costs and enhancing the uniform strength of the web.

Figure 2:
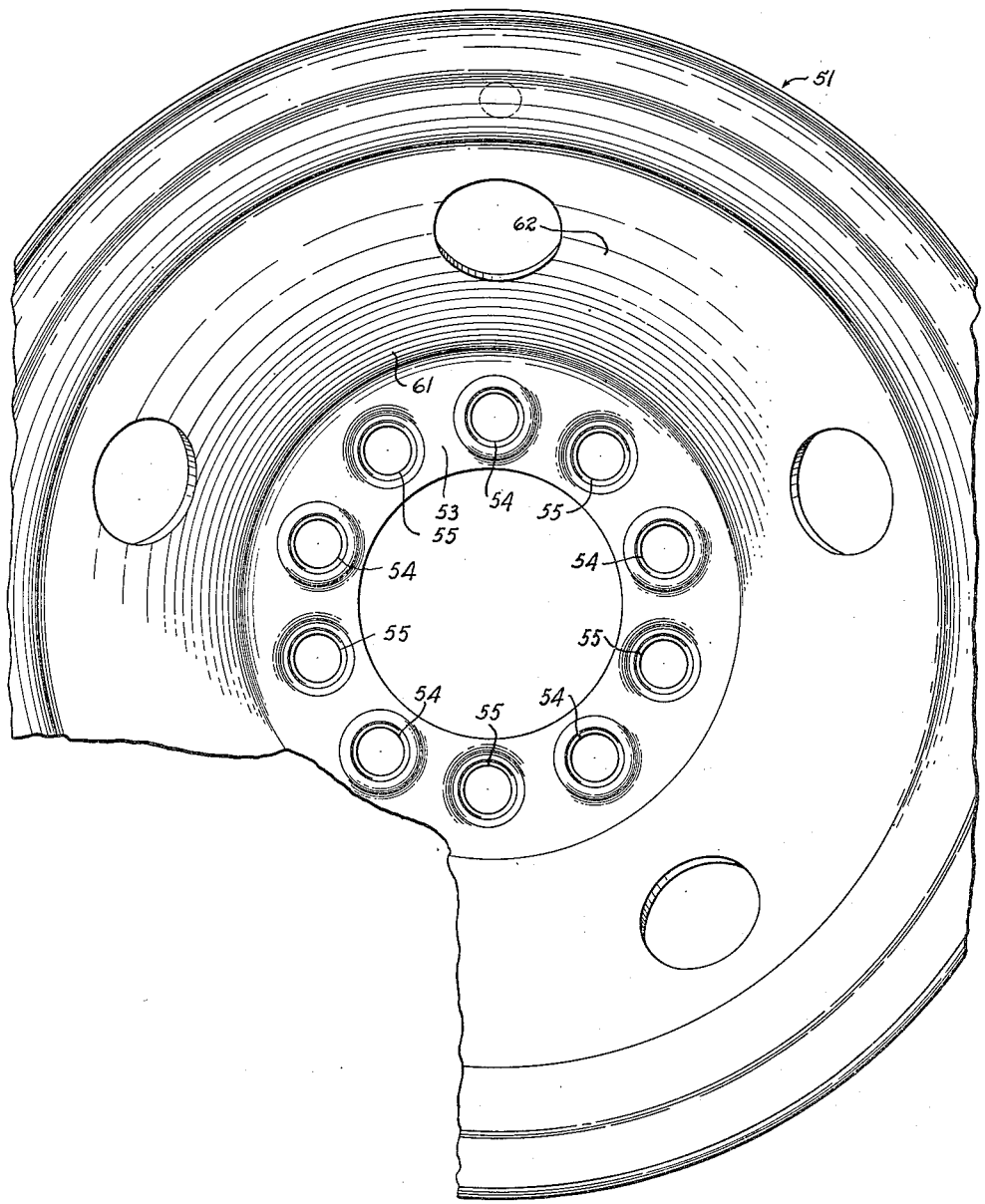
Fig. 2 is a fragmentary side elevation as viewed from the outboard side of the wheel shown in Fig. 1.

Referring now in detail to the illustrative embodiment of the invention shown by way of example in the accompanying drawings, the structure of Figs. 1 and 2 of the drawings incorporates the present invention in wheels adapted to be mounted in dual fashion for heavy duty uses. As there shown the duplicate wheels 51 and 52 are formed with mounting portions 53 at their inner peripheries having two series of similarly beveled mounting apertures 54 and 55 the apertures of each series being alternately positioned with respect to the apertures of the other series. The apertures of each series are axially displaced with respect to the adjacent apertures of the other series providing a strong web formation and a tight mounting for the nuts 56. The wheels are preferably mounted in oppositely facing directions and with correspondingly formed apertures adjacent to receive the mounting bolts 57 so that, as shown in Fig. 1, the web portions having the apertures 54 therein are spaced from each other and with the portions of the inner web 52 abutting the mounting surface of the hub flange 58 (or of the brake drum adapter 59 mounted thereon), while the portions of the webs having the apertures 55 therein abut each other and are spaced from the mounting flange 58. Preferably enough mounting bolts 57 are provided for all of the apertures of a wheel since a dual wheel mounting requires greater hub attaching security. If desired, a plurality of frusto-conical inserts 60 may be provided about the mounting bolts 57 which pass through apertures 54 where the wheel web lies adjacent the hub flange. There is thus provided a dual wheel mounting wherein all of the mounting nuts are subject to back pressure from the web against which it bears, making a secure and non-loosening mounting for the wheels.

Immediately radially outwardly of mounting portions 53 the webs 51 and 52 are formed in turned portions or beads 61 which abut when the wheels are mounted in dual fashion as shown. Radially outwardly of the beads 61 the webs are convexly curved in their portions 62 extending to the rim formation at the outer periphery. The webs 51 and 52 are thus formed to incorporate the advantages already discussed in connection with Figs. 3 and 4, and the wheels are similarly formed of uniform thickness throughout their radial extent, and additional advantages are realized in mounting dual wheels of the type shown and described.

The invention in its broader aspects is not limited to the specific mechanisms shown and described but departures may be made therefrom, within the scope of the accompanying claims, without departing from the principles of the invention and without sacrificing its chief advantages.

What I claim is:

1. A vehicle wheel for mounting in dual relationship comprising a web element having a corrugated annular mounting portion radially inwardly thereof comprised of axially offset portions, alternate ones of said last portions being adapted to abut a substantially plane hub mounting surface when positioned adjacent thereto and be spaced from corresponding portions on a duplicate wheel mounted adjacent thereto in opposite facing relationship, while the other alternate ones of said last portions are adapted to be spaced from such hub mounting surface and abut corresponding portions on such a duplicate wheel when so mounted, and a turned continuous annular bead portion immediately radially outwardly of said mounting portion having an annular surface lying in the same plane substantially normal to the axis of the wheel as said other alternate ones of said portions to abut the same bead portion on such a duplicate wheel when so mounted.

2. A vehicle wheel for mounting in dual relationship comprising a web element having a corrugated annular mounting portion radially inwardly thereof comprised of axially offset portions, alternate ones of said last portions being adapted to abut a substantially plane hub mounting surface when positioned adjacent thereto and be spaced from corresponding portions on a duplicate wheel mounted adjacent thereto in opposite facing relationship, while the other alternate ones of said last portions are adapted to be spaced from said hub mounting surface and abut corresponding portions on such a duplicate wheel when so mounted, a turned continuous annular bead portion immediately radially outwardly of said mounting portion having an annular surface lying in the same plane substantially normal to the axis of the wheel as said other alternate ones of said portions to abut the same bead portion on such a duplicate wheel when so mounted and another curved portion extending from said bead portion to the rim of the wheel the tangents of said other curved portion forming angles with a line normal to the axis of the wheel of decreasing size as such tangents are taken from radially inwardly to radially outwardly of said other curved portion.

CHARLES S. ASH.

REFERENCES CITED

The following references are of record in the file of this patent:

UNITED STATES PATENTS

| Number | Name | Date |
|---|---|---|
| 1,714,512 | LeJeune et al. | May 28, 1929 |
| 1,934,971 | Eksergian | Nov. 14, 1933 |
| 2,127,599 | Horn | Aug. 23, 1938 |
| 2,197,608 | Burger | Apr. 16, 1940 |
| 2,424,106 | Martens | July 15, 1947 |
| 2,453,512 | Jacobi | Nov. 9, 1948 |

FOREIGN PATENTS

| Number | Country | Date |
|---|---|---|
| 125,309 | Austria | 1931 |
| 704,411 | France | 1931 |
| 372,341 | Italy | 1939 |